(12) United States Patent
Habing (10) Patent No.: US 11,927,297 B1
(45) Date of Patent: Mar. 12, 2024

(54) CANOPY TILT ADJUSTOR FOR SWING

(71) Applicant: HABLAMER, LLC, Green Cove Springs, FL (US)

(72) Inventor: Theodore G. Habing, Tustin, CA (US)

(73) Assignee: Hablamer, LLC, Carson City, NV (US)

( * ) Notice: Subject to any disclaimer, the term of this patent is extended or adjusted under 35 U.S.C. 154(b) by 348 days.

(21) Appl. No.: 17/402,373

(22) Filed: Aug. 13, 2021

Related U.S. Application Data (60) Provisional application No. 63/068,722, filed on Aug. 21, 2020.

(51) Int. Cl.
*F16M 11/12* (2006.01)
*A45B 11/00* (2006.01)
*A45B 17/00* (2006.01)

(52) U.S. Cl.
CPC ............ *F16M 11/12* (2013.01); *A45B 11/00* (2013.01); *A45B 17/00* (2013.01); *F16M 2200/024* (2013.01)

(58) Field of Classification Search
CPC .. F16M 11/12; F16M 11/00; F16M 2200/024; A45B 11/00; A45B 17/00
See application file for complete search history.

(56) References Cited

U.S. PATENT DOCUMENTS

| | | | |
|---|---|---|---|
| 663,279 A * | 12/1900 | Jones | E04H 15/003 135/130 |
| 735,454 A | 8/1903 | Bradbury | |
| 2,731,973 A * | 1/1956 | Roth et al. | A45B 17/00 135/65 |
| 2,905,187 A * | 9/1959 | Croce | A45B 17/00 135/65 |
| 5,280,871 A | 1/1994 | Chuang | |
| 5,588,702 A * | 12/1996 | Litwin | A47C 3/0255 297/277 |
| 6,575,182 B2 * | 6/2003 | Tung | A45B 25/14 135/20.1 |
| 6,769,442 B2 * | 8/2004 | Johnson | A01M 31/025 135/96 |
| 6,994,631 B1 * | 2/2006 | Habing | A47C 3/0255 472/125 |

(Continued)

FOREIGN PATENT DOCUMENTS

| CN | 2164207 | 5/1994 |
|---|---|---|
| CN | 2659779 | 12/2004 |

(Continued)

*Primary Examiner* — Anita M King
(74) *Attorney, Agent, or Firm* — Aikin & Gallant, LLP (57) ABSTRACT

A garden swing canopy adjustor comprising; a support member having a first end configured to be coupled to a garden swing canopy and a second end; a first adjustment mechanism fixedly coupled to the second end of the support member, the first adjustment mechanism is operable to rotate the support member around a first axis to adjust a tilt of the garden swing canopy in a first direction; and a second adjustment mechanism coupled to the first adjustment mechanism, the second adjustment mechanism is operable to rotate the support member around a second axis to adjust the tilt of the garden swing canopy in a second direction, and wherein the second axis is perpendicular to the first axis and comprises a fixed orientation.

60 Claims, 10 Drawing Sheets

(56) References Cited

U.S. PATENT DOCUMENTS

| | | |
|---|---|---|
| 7,028,699 B2 | 4/2006 | Lee |
| 7,533,680 B2 * | 5/2009 | Ma .................. A45B 17/00 |
| | | 135/21 |
| 9,791,101 B1 | 10/2017 | Frankel et al. |
| 10,280,956 B2 | 5/2019 | Xiang et al. |
| 10,667,610 B2 * | 6/2020 | Habing ............. A47C 3/0255 |
| 2008/0105289 A1 | 5/2008 | Ma |
| 2009/0036225 A1 * | 2/2009 | Tseng ............... A47C 3/0255 |
| | | 472/125 |
| 2018/0045231 A1 | 2/2018 | Xiang et al. |
| 2022/0125169 A1 * | 4/2022 | Ma .................. A45B 25/08 |

FOREIGN PATENT DOCUMENTS

| | | |
|---|---|---|
| CN | 2690714 | 4/2005 |
| CN | 206596750 | 10/2017 |

\* cited by examiner

CANOPY TILT ADJUSTOR FOR SWING

CROSS-REFERENCE TO PENDING APPLICATION

This application claims priority to U.S. Provisional Application No. 63/068,722 filed Aug. 21, 2020 entitled "CANOPY TILT ADJUSTOR FOR SWING," which is incorporated herein in its entirety.

FIELD

The present invention relates to a canopy tilt adjustor, more specifically a multi directional canopy tilt adjustor for a garden swing. Other aspects are also described and claimed.

BACKGROUND

Garden swings are popular backyard, garden and pool accessories for sitting, relaxing and outdoor entertaining. In some cases, the swing may include an optional canopy to shade the user from the sun. When the location of the sun changes, however, the canopy may no longer be in the proper position to protect the user from the sun. In some cases, the canopy's position may be adjustable so that it can be changed as desired by the user. Canopies, however, can sometimes be relatively heavy and difficult for the user to manipulate, particularly when the user is seated in a moving swing.

SUMMARY

An aspect of the disclosure is directed to a canopy tilt adjustor for a canopy coupled to a swing. More particularly, a multi-directional canopy tilt adjustor for a canopy coupled to a garden swing. In some aspects, the garden swing may be pivotally suspended from a swing frame and the canopy may be mounted to a portion of the frame above the swing and the user's head. For example, the seat may be pivotally suspended on a single pivot axis from the frame so as to provide pendular movement when in motion. The canopy may be mounted to a top portion of the frame by a canopy adjustor so that the canopy is above the head of the user and can be adjusted in multiple directions by the user.

In one aspect, a garden swing canopy adjustor includes a support member having a first end configured to be coupled to a garden swing canopy and a second end; a first adjustment mechanism fixedly coupled to the second end of the support member, the first adjustment mechanism is operable to rotate the support member around a first axis to adjust a tilt of the garden swing canopy in a first direction; and a second adjustment mechanism coupled to the first adjustment mechanism, the second adjustment mechanism is operable to rotate the support member around a second axis to adjust the tilt of the garden swing canopy in a second direction, and wherein the second axis is perpendicular to the first axis and comprises a fixed orientation. In some aspects, the first axis is a pitch axis and the first direction is a forward direction or a backward direction. In some aspects, the second axis is a roll axis and the second direction is a left direction or a right direction. In some aspects, the rotation of the support member around the second axis changes an orientation of the first axis. In some aspects, a rotation of the support member around the first axis does not rotate the support member around the second axis. In still further aspects, a rotation of the support member around the second axis also rotates the first adjustment mechanism around the second axis. In some aspects, the first adjustment mechanism includes a body portion fixedly coupled to the second end of the support member and a handle coupled to the body portion for controlling the rotation of the support member around the first axis. The handle may be coupled to a lever that releasably engages with a positioning bracket having a plurality of notches to hold the support member at the desired angle of rotation, and squeezing the handle releases the lever from the positioning bracket. In some aspects, the second adjustment mechanism includes a positioning bracket fixedly coupled to a garden swing support member and a handle coupled to the positioning bracket for controlling the rotation of the second adjustment mechanism around the second axis. The handle may be coupled to a lever that releasably engages with a positioning bracket having a plurality of openings, and pushing the handle releases the lever from the positioning bracket. The support member may be a telescoping bar that is operable to adjust a distance between the garden swing canopy and a garden swing to which it is coupled. The telescoping bar may adjust the garden swing canopy between a maximum distance from the garden swing and a minimum distance from the garden swing, and wherein adjustment of the garden swing canopy in the second direction increases toward the maximum distance. In some aspects, the second adjustment mechanism is fixedly coupled to an overhead frame member from which a garden swing is suspended such that a user operates the adjustor above their head. The first axis and the second axis may be closer to the garden swing canopy than the garden swing. The first adjustment mechanism and the second adjustment mechanism may be configured to be controlled independently by one hand of the user. In some aspects, the first adjustment mechanism and the second adjustment mechanism do not comprise a ball joint.

In another aspect, a garden swing canopy adjustor includes a support member having a first end configured to be coupled to a garden swing canopy and a second end; a first adjustment mechanism fixedly coupled to the second end of the support member, the first adjustment mechanism is operable to rotate the support member around a first axis to adjust a tilt of the garden swing canopy in a first direction; and a second adjustment mechanism coupled to the first adjustment mechanism, the second adjustment mechanism is operable to rotate the support member around a second axis, different from the first axis, to adjust the tilt of the garden swing canopy in a second direction In still further aspects, a garden swing canopy adjustor includes a support member having a first end configured to be coupled to a garden swing canopy and a second end; a first adjustment mechanism coupled to the second end of the support member, the first adjustment mechanism is operable to rotate the support member around a first axis to adjust a tilt of the garden swing canopy in a first direction; and a second adjustment mechanism coupled to the first adjustment mechanism, the second adjustment mechanism is operable to rotate the support member around a second axis to adjust the tilt of the garden swing canopy in a second direction; wherein the first and second adjustment mechanisms are operated independently.

In another aspect, a canopy adjustor for a garden swing with a single pivot pendulous motion swing seat includes a support member having a first end configured to be coupled to a garden swing canopy and a second end; a first adjustment mechanism coupled to the second end of the support member, the first adjustment mechanism including a first lock and release mechanism that is operable to rotate the support member around a first axis to adjust a tilt of the garden swing canopy in a first direction; and a second adjustment mechanism coupled to the first adjustment mechanism, the second adjustment mechanism including a second lock and release mechanism that is operable to rotate the support member around a second axis to adjust the tilt of the garden swing canopy in a second direction, and wherein the canopy adjuster is located above the swing seat and operable to be manipulated above the head of a user seated in the swing seat with one hand. In some aspects, the first adjustment mechanism includes a body portion fixedly coupled to the second end of the support member and a handle coupled to the body portion for controlling the rotation of the support member around the first axis. In some aspects, the first lock and release mechanism comprises a lever that releasably engages with a positioning bracket having a plurality of notches to hold the support member at the desired angle of rotation, and squeezing the handle releases the lever from the positioning bracket. In some aspects, the second adjustment mechanism includes a positioning bracket fixedly coupled to a garden swing support member and a handle coupled to the positioning bracket for controlling the rotation of the second adjustment mechanism around the second axis. The second lock and release mechanism may include a lever that releasably engages with a positioning bracket having a plurality of openings, and pushing the handle releases the lever from the positioning bracket.

The above summary does not include an exhaustive list of al aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

DETAILED DESCRIPTION

In this section we shall explain several preferred aspects of this invention with reference to the appended drawings. Whenever the shapes, relative positions and other aspects of the parts described in the aspects are not clearly defined, the scope of the invention is not limited only to the parts shown, which are meant merely for the purpose of illustration. Also, while numerous details are set forth, it is understood that some aspects of the invention may be practiced without these details. In other instances, well-known structures and techniques have not been shown in detail so as not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
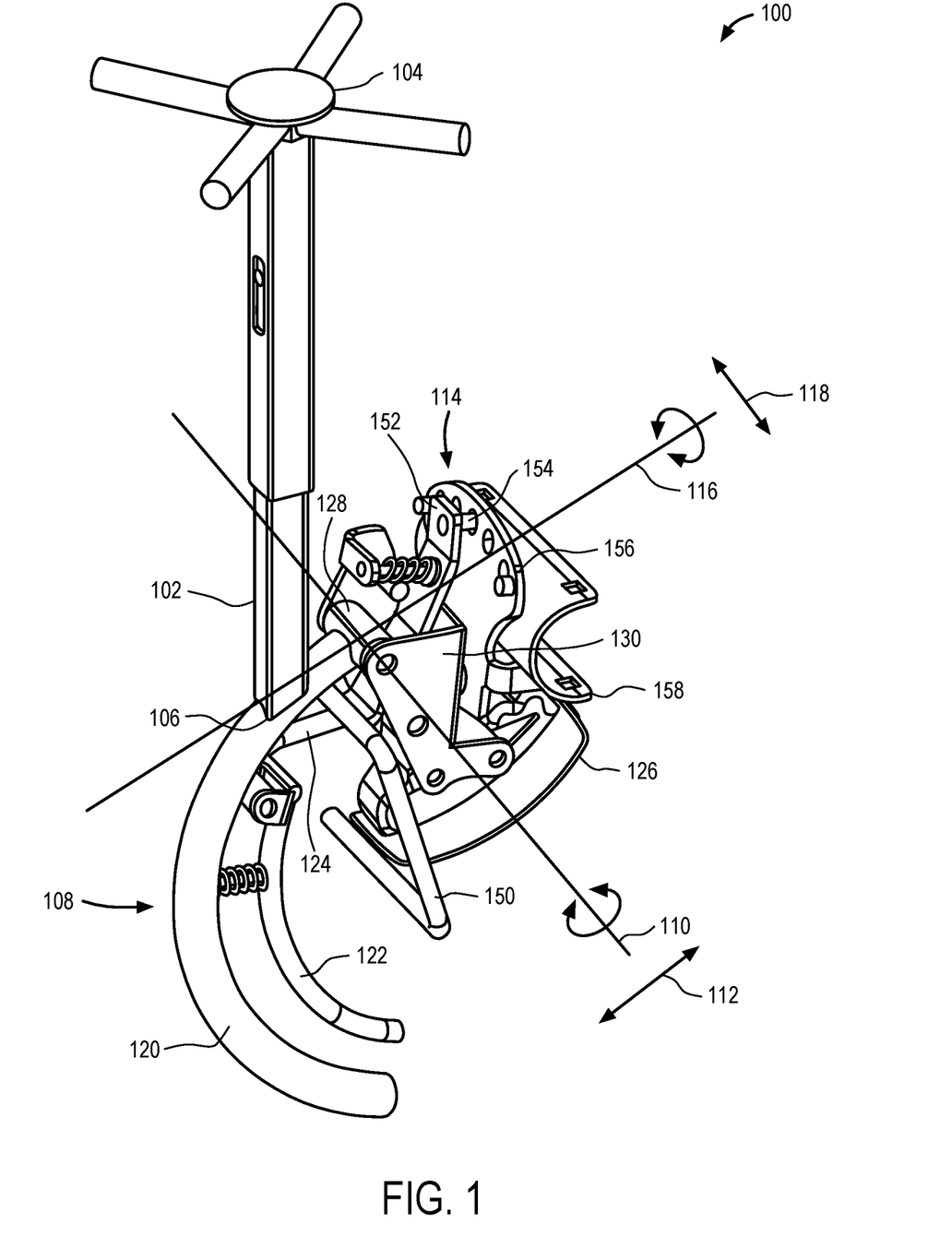
FIG. 1 illustrates a right back side perspective view of one embodiment of a canopy adjustor.
Figure 9:
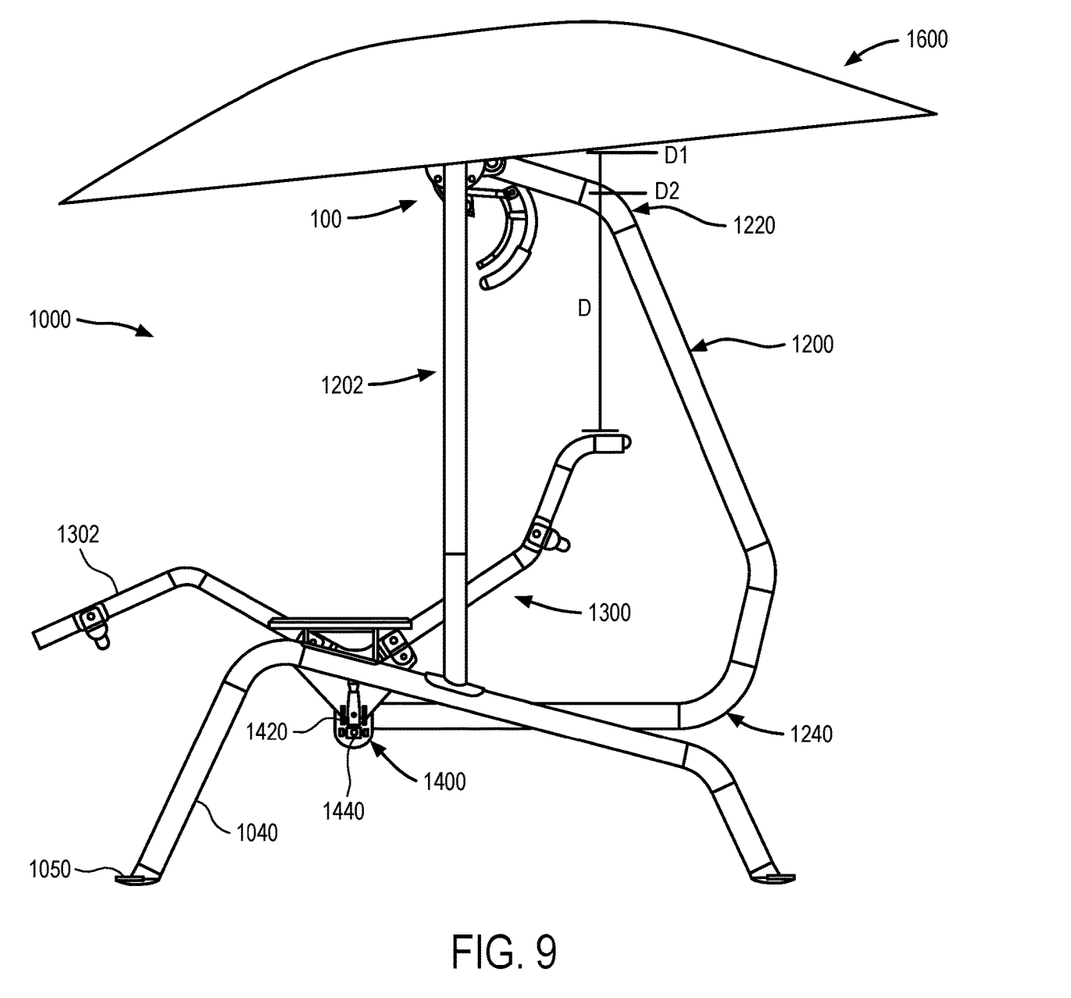
FIG. 9 illustrates a left side view of a garden swing including a canopy adjustor.
Figure 10:
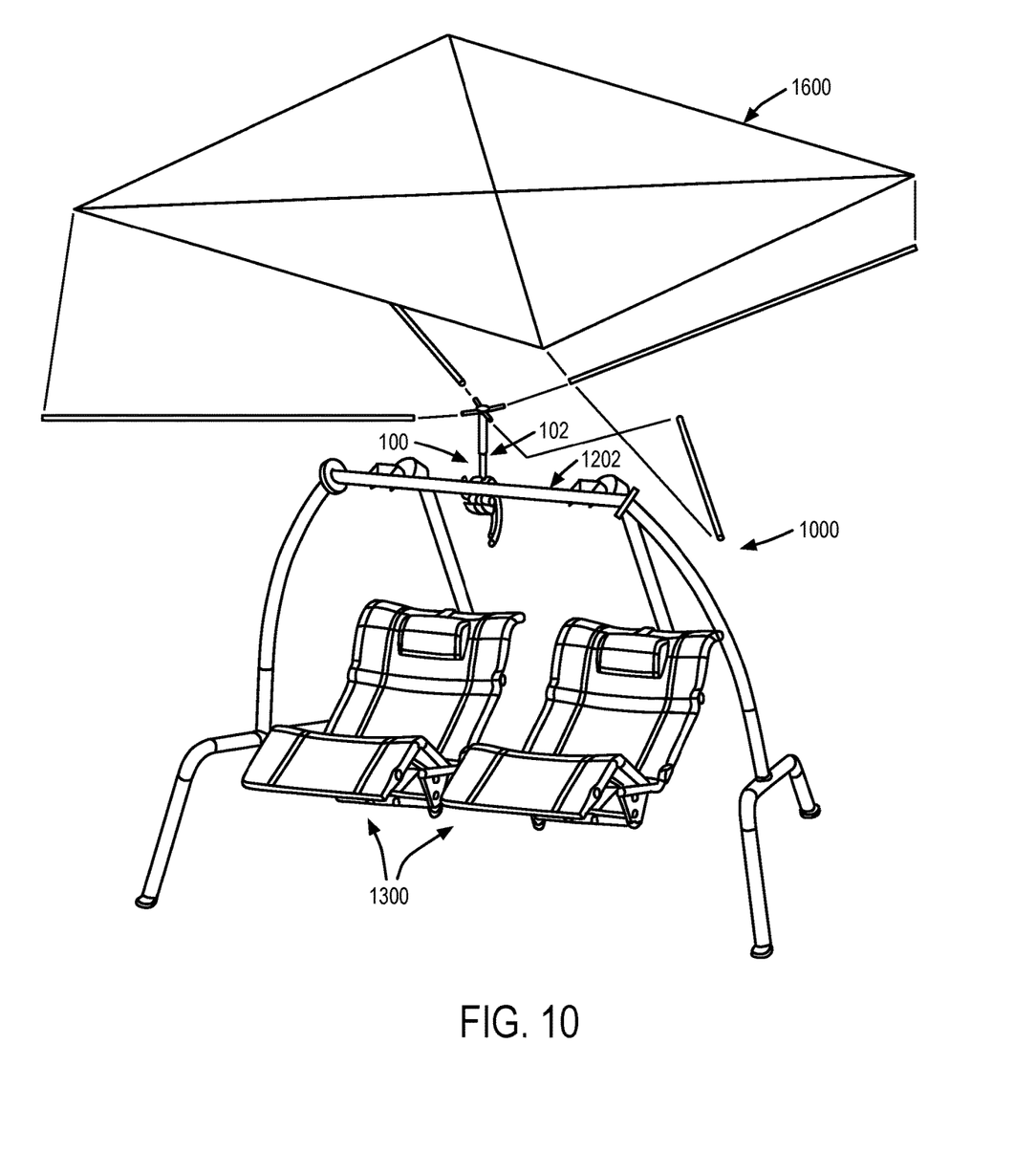
FIG. 10 illustrates a front side perspective view of a garden swing including a canopy adjustor.

FIG. 1 illustrates a right back side perspective view of one embodiment of a canopy adjustor. Canopy adjustor 100 may be used to support a canopy above a swing, for example a garden swing as shown in FIGS. 9-10, and adjust the position or tilt of the canopy in a number of different directions and/or angles. The canopy may be any type of structure designed to provide shade, for example an umbrella like structure, and may be supported above the swing by the adjustor 100. Adjustor 100 may be mounted to the frame of the swing and include a support member 102 having a first or top end 104 and a second or bottom end 106. The top end 104 may be coupled to the canopy and the bottom end 106 may be coupled to a first adjustment mechanism 108 of the adjustor 100. In some aspects, the support member 102 may have an adjustable length so that a distance between the canopy and the swing can be changed as desired by the user. For example, support member 102 may be a telescoping bar that can be extended or contracted to increase or decrease a distance D of the canopy from the swing between a maximum distance D1 and a minimum distance D2 (see e.g., FIG. 9).

The first adjustment mechanism 108 may be configured to allow for adjustment of the position, angle and/or tilt of an associated canopy in at least one direction. The first adjustment mechanism 108 may be coupled to a second adjustment mechanism 114 configured to allow for adjustment of the position, angle and/or tilt of the canopy in at least one other direction. For example, first adjustment mechanism 108 may be fixedly attached to the bottom end 106 of the support member 102 and operable to rotate the support member 102 around a first axis 110. Rotation of the support member 102 around the first axis 110 may, in turn, tilt the canopy in a first direction 112. In some aspects, the first axis 110 may be considered a pitch axis and the first direction 112 may be a forward and/or backward direction. The second adjustment mechanism 114 may be operable to rotate the support member 102 around a second axis 116. The second axis 116 may be perpendicular to the first axis 110. Rotation of the support member 102 around the second axis 116 may, in turn, tilt the canopy in a second direction 118. In some aspects, the second axis 116 may be considered a roll axis and the second direction 118 may be a left and/or right direction. It should be understood that the forward and/or backward direction and left and/or right directions are from the perspective of the overall swing assembly and/or a user seated in the swing assembly, as shown in the drawings. For example, tilting the canopy (or support member) in a forward direction would be toward the front side of the swing (or user), tilting the canopy (or support member) in a backward direction would be toward the back side of the swing (or the user), tilting the canopy (or support member) left would be toward the left side of the swing (or the user) and tilting the canopy (or support member) right would be toward the right side of the swing (or user).

Referring now to the first adjustment mechanism 108 in more detail, first adjustment mechanism 108 may include, for example, a body portion 120, a handle 122, a lever 124 and a positioning bracket 126. The body portion 120 may have one end that is connected to a joint 128 which forms the first axis 110. The joint 128 allows the first adjustment mechanism 108 to rotate around a first axis 110. The bottom end 106 of the support member 102 is attached to the body portion 120 near the joint 128 such that rotation of body portion 120 around joint 128 (e.g., first axis 110) tilts the canopy forward or backward. The joint 128 is, in turn, connected to a positioning bracket 126 by a connecting bracket 130. The positioning bracket 126 can be engaged and/or disengaged by the lever 124 to lock the canopy at the desired tilt angle and/or release the canopy for adjustment by the user, as will be described in more detail in reference to FIGS. 2-4. The other end of body portion 120 has an arc like shape and extends below the swing frame and can be grasped by the user to help rotate the body portion 120 around joint 128 and tilt the canopy. Handle 122 is connected to, and positioned along, the front side of the body portion 120 extending below the frame. Squeezing and/or releasing the handle 122 engages or disengages the lever 124 from the positioning bracket 126 so that the tilt of the canopy can be adjusted.

Figure 2:
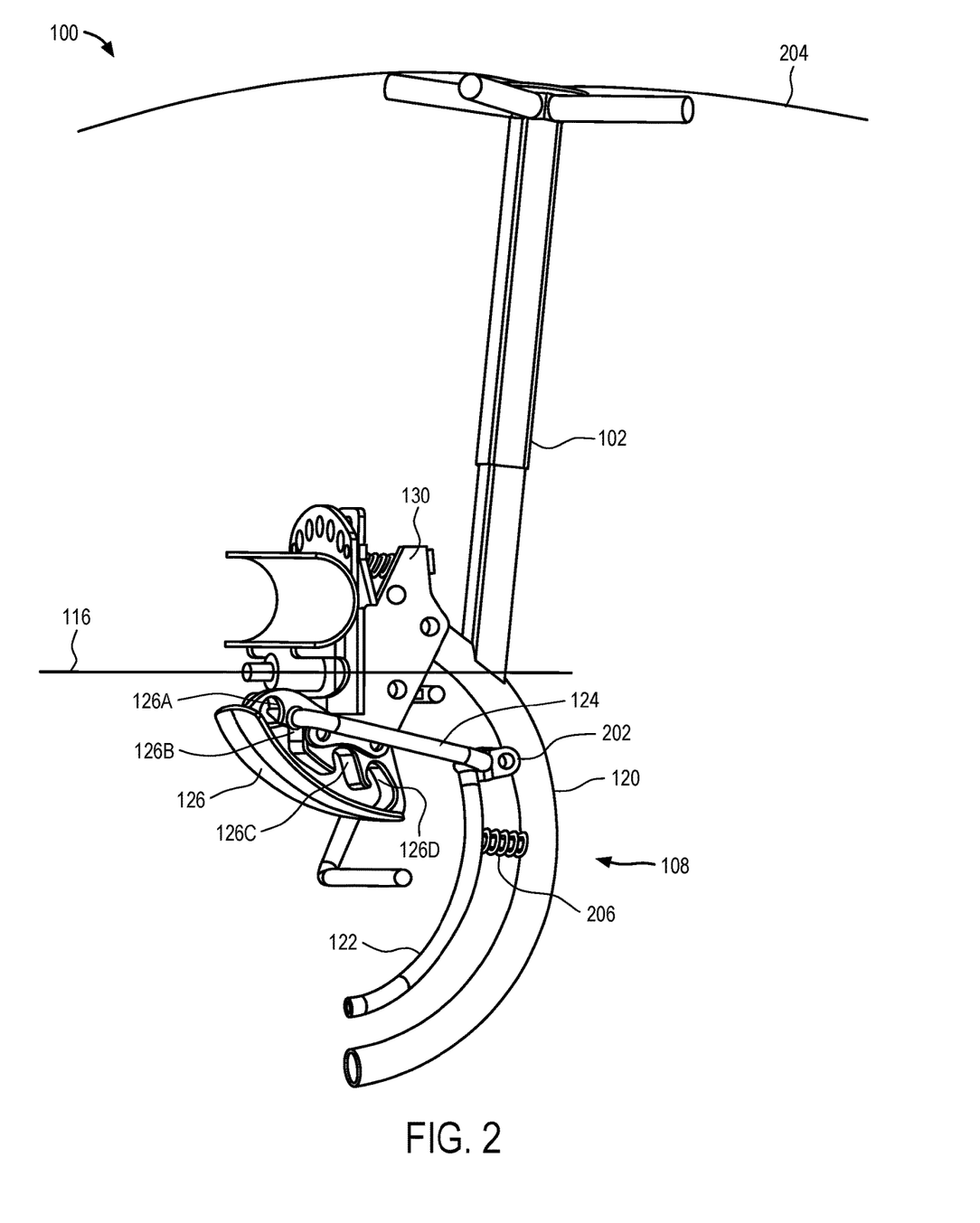
FIG. 2 illustrates a left front side perspective view of one embodiment of the canopy adjustor of FIG. 1.
Figure 3:
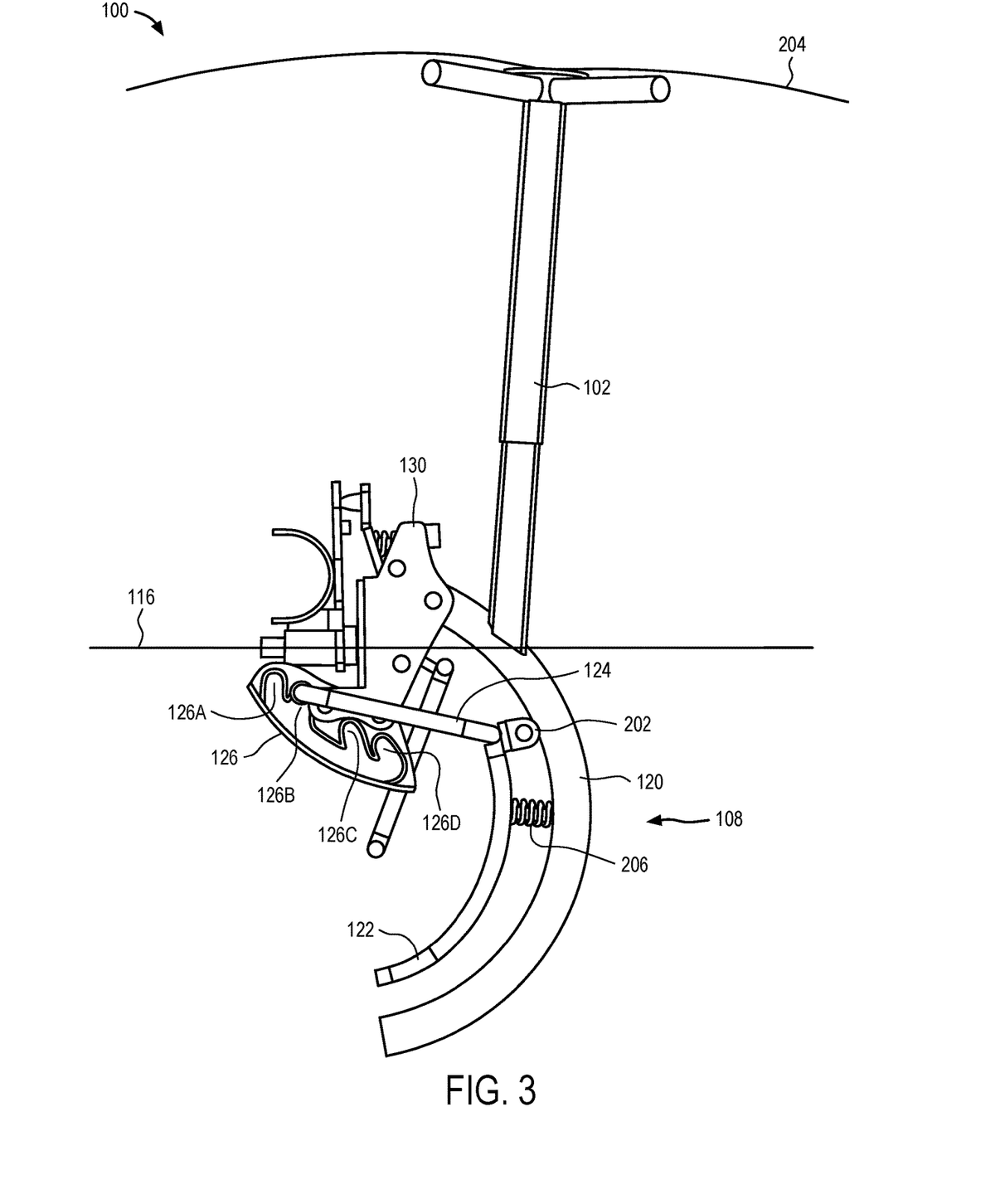
FIG. 3 illustrates a left side view of one embodiment of the canopy adjustor of FIG. 1.
Figure 4:
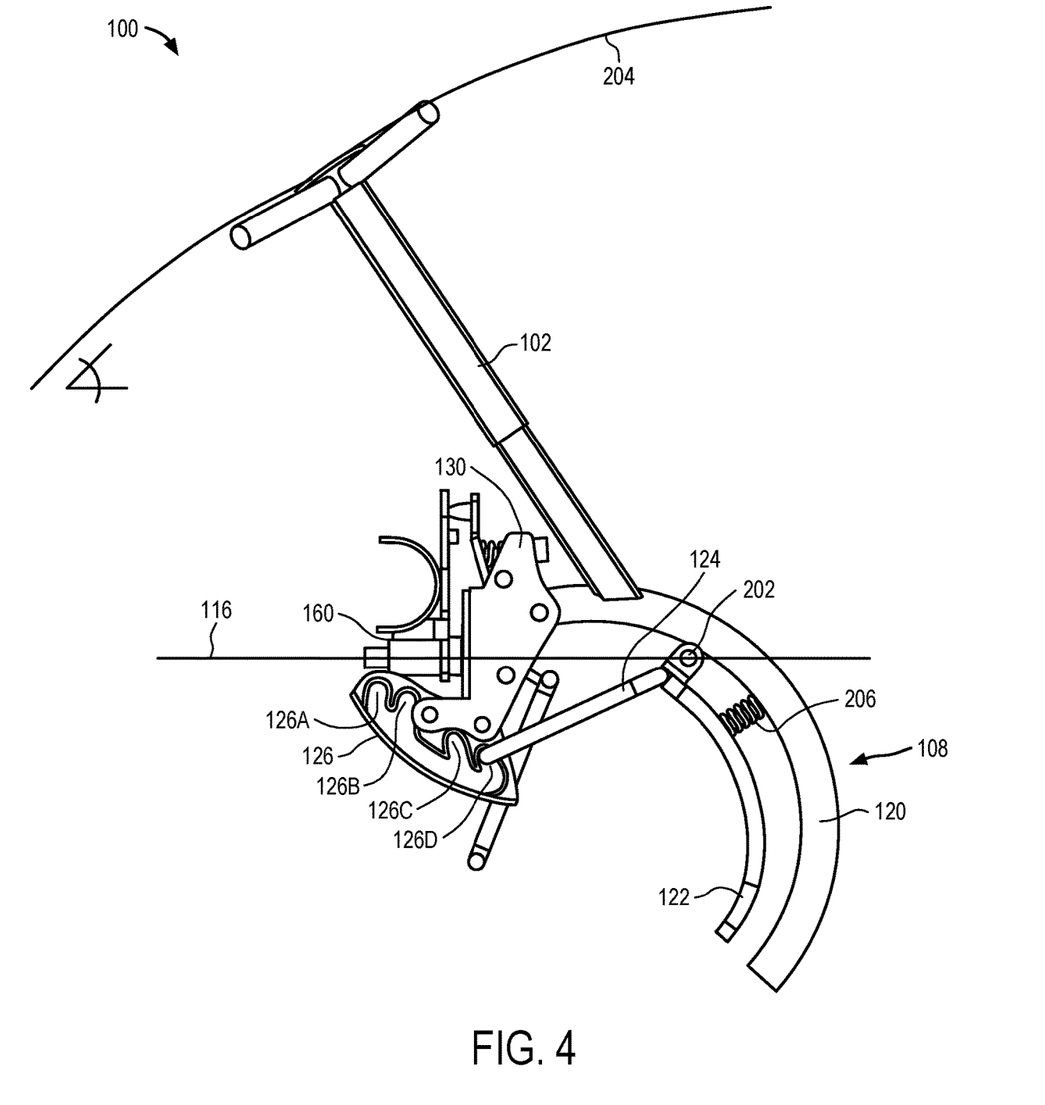
FIG. 4 illustrates a left side view of one embodiment of the canopy adjustor of FIG. 1.

The operation of the first adjustment mechanism 108 may be more easily understood from FIGS. 2-4. Representatively, it can be seen from FIGS. 2-4 that positioning bracket 126 includes a number of recessed regions or notches 126A, 126B, 126C, and 126D. The recessed regions or notches 126A-D are dimensioned to receive and hold lever 124, which in turn, locks the support member 102 and canopy 204 at the desired tilt angle. For example, as can be seen from FIGS. 2-3, when the lever 124 is engaged with the notch 126B, the support member 102 is in an almost vertical position and the canopy 204 is considered locked at a tilt angle, for example, a first tilt angle. The tilt angle could correspond to, for example, the canopy 204 being in a relatively horizontal position relative to ground (when the seat is stationary). In addition, it should be noted that an orientation of the second axis 116 remains fixed therefore the tilt angle may also be measured relative to the second axis 116. For example, the tilt of the canopy at the tilt angle could be described as horizontal or parallel relative to the second axis 116. Alternatively, when the lever 124 engages the last notch 126D, the support member 102 (and in turn the canopy 204) tilts forward and is locked at another tilt angle. This second tilt angle could correspond to, for example, the canopy being at a non-horizontal position or angle relative to ground or the second axis 116 (e.g., a tilt angle of 90 degrees or less). When the lever 124 engages the remaining notches 126A or 126C, the canopy may be tilted at other angles different from the first and second tilt angles. For example, when notch 126A is engaged the canopy may be locked in a slightly rearward tilt angle, and engaging notch 126C may tilt the canopy forward to keep the sun out of eyes of the user when seated.

The user can adjust the tilt angle as desired by releasing the lever 124 from the positioning bracket 126. Representatively, handle 122 may be coupled to body portion 120 at a pivot point 202 and biased away from body portion 120 by a biasing member 206 (e.g., a spring). When the user squeezes handle 122 toward body portion 120, the end of lever 124 is caused to move down and disengage from the notches 126A-126D. The user can then rotate the body portion 120 about first axis 110 to achieve the desired canopy tilt. When the user releases handle 122, the biasing member 206 causes the handle 122 to return to its resting or non-actuated position. This, in turn, causes the lever 124 to reengage with the notches 126A-D and lock the canopy 204 at the desired tilt angle. This operation and/or configuration of the handle 122, lever 124 and positioning bracket 126 used to lock and release the adjustment mechanism 108 may also be generally referred to herein as a lock and release mechanism, or the adjustment mechanism including the above described components may be considered the lock and release mechanism.

Returning now to the second adjustment mechanism 114, the second adjustment mechanism 114 may be attached to the first adjustment mechanism 108, and is further mounted to the swing frame by support bracket 158. As previously discussed, the second adjustment mechanism 114 allows for rotation of the support member 102, and in turn the canopy 204, about the second axis 116 (e.g., in a left and/or right direction). It should further be noted that the first and second adjustment mechanisms are configured such that a rotation of the second mechanism 114 or support member 102 around the second axis 116 may also rotate the first adjustment mechanism 108 about the second axis 116. A rotation of the first adjustment mechanism 108 or support member 102 around the first axis 110, however, does not rotate the support member 102 about the second axis 116.

The second axis 116 may be defined by the joint 160, which can be seen in FIG. 4. The second adjustment mechanism 114 may include, for example, a handle 150, a lever 152, a biased pin 154 and a positioning bracket 156 that allow for rotation of the support member 102 about the joint 160 defining the second axis 116. The joint 160 may be in a fixed orientation relative to the mounting bracket 158. For example, the joint 160 may extend from the front side of the positioning bracket 156, and both the joint 160 and the positioning bracket 156 may be mounted to the mounting bracket 158 that attaches the second adjustment mechanism 114 to the swing frame. The remaining components of the second adjustment mechanism 114 (and the first adjustment mechanism 108) may rotate around the second axis 116 to cause the desired adjustment to the tilt angle of the support member 102 and associated canopy 204. Accordingly, a rotation of the support member 102 by the first adjustment mechanism 108 or the second adjustment mechanism 114 does not change the orientation of the second axis 116. The second adjustment mechanism 114 is, however, coupled to the first adjustment mechanism 108 such that a rotation of the support member 102 or second adjustment mechanism 114 about the second axis 116 may change orientation of the first axis 110 (see e.g., FIGS. 5-8).

Figure 5:
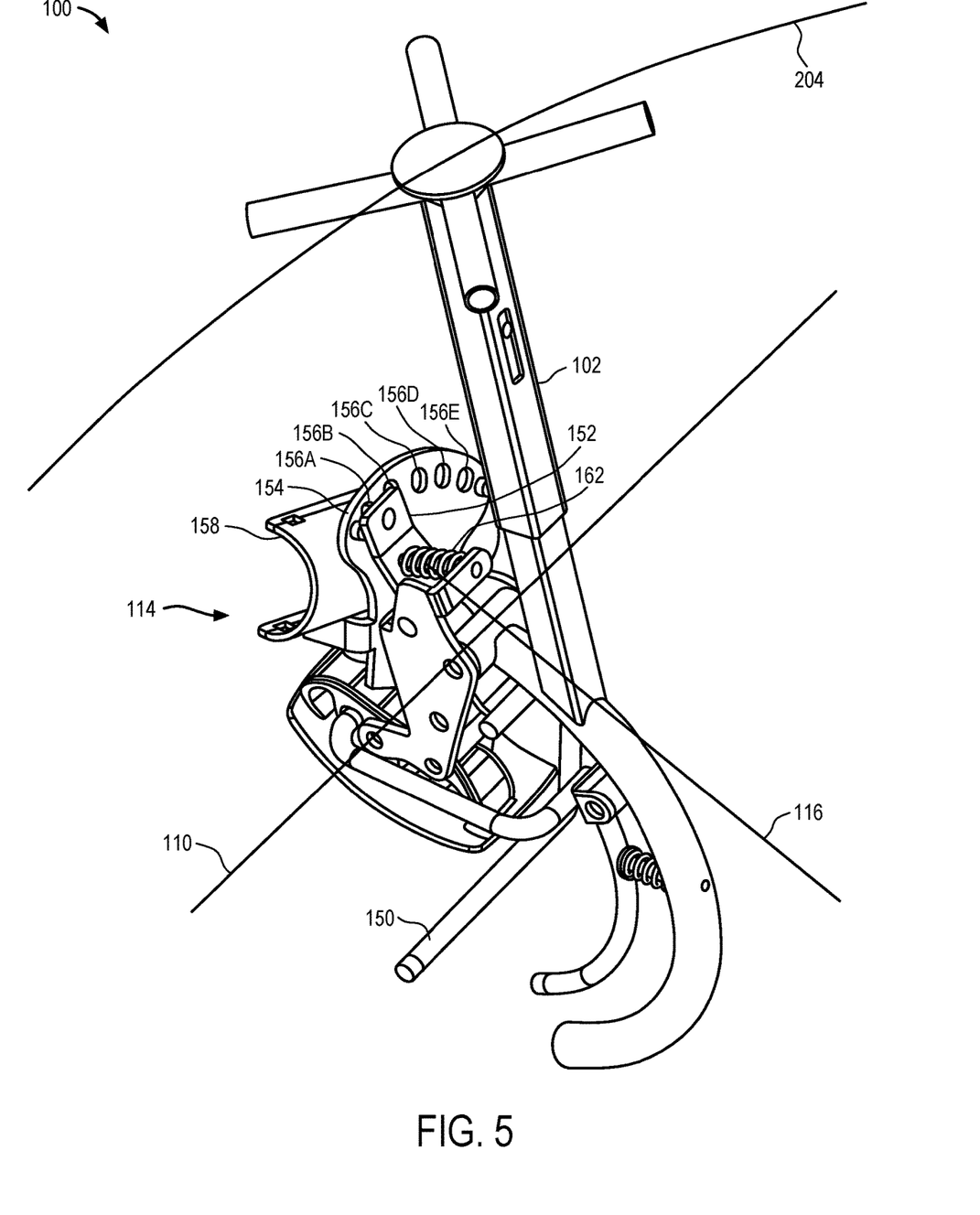
FIG. 5 illustrates a left back side perspective view of one embodiment of the canopy adjustor of FIG. 1.
Figure 6:
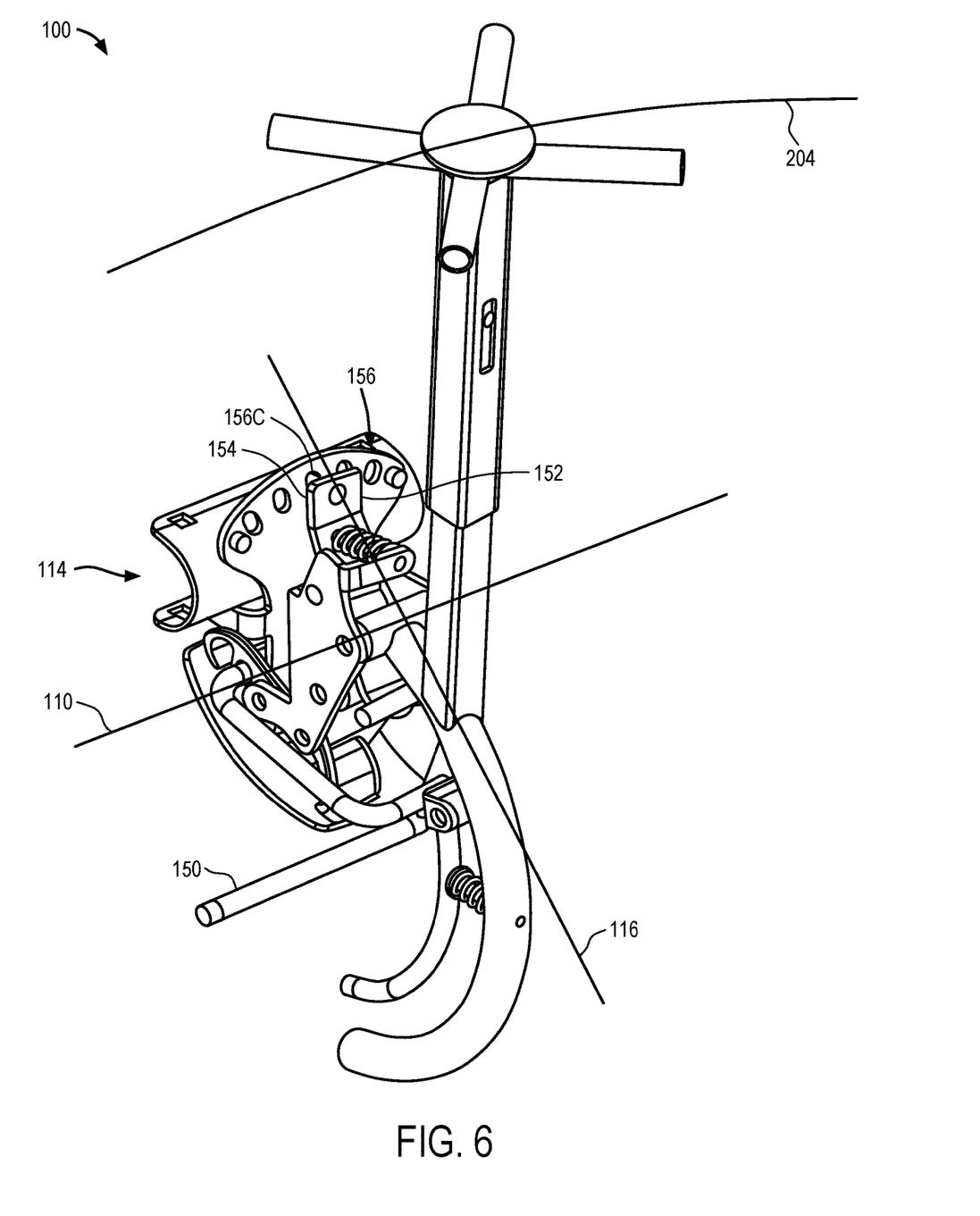
FIG. 6 illustrates a left back side perspective view of one embodiment of the canopy adjustor of FIG. 1.
Figure 7:
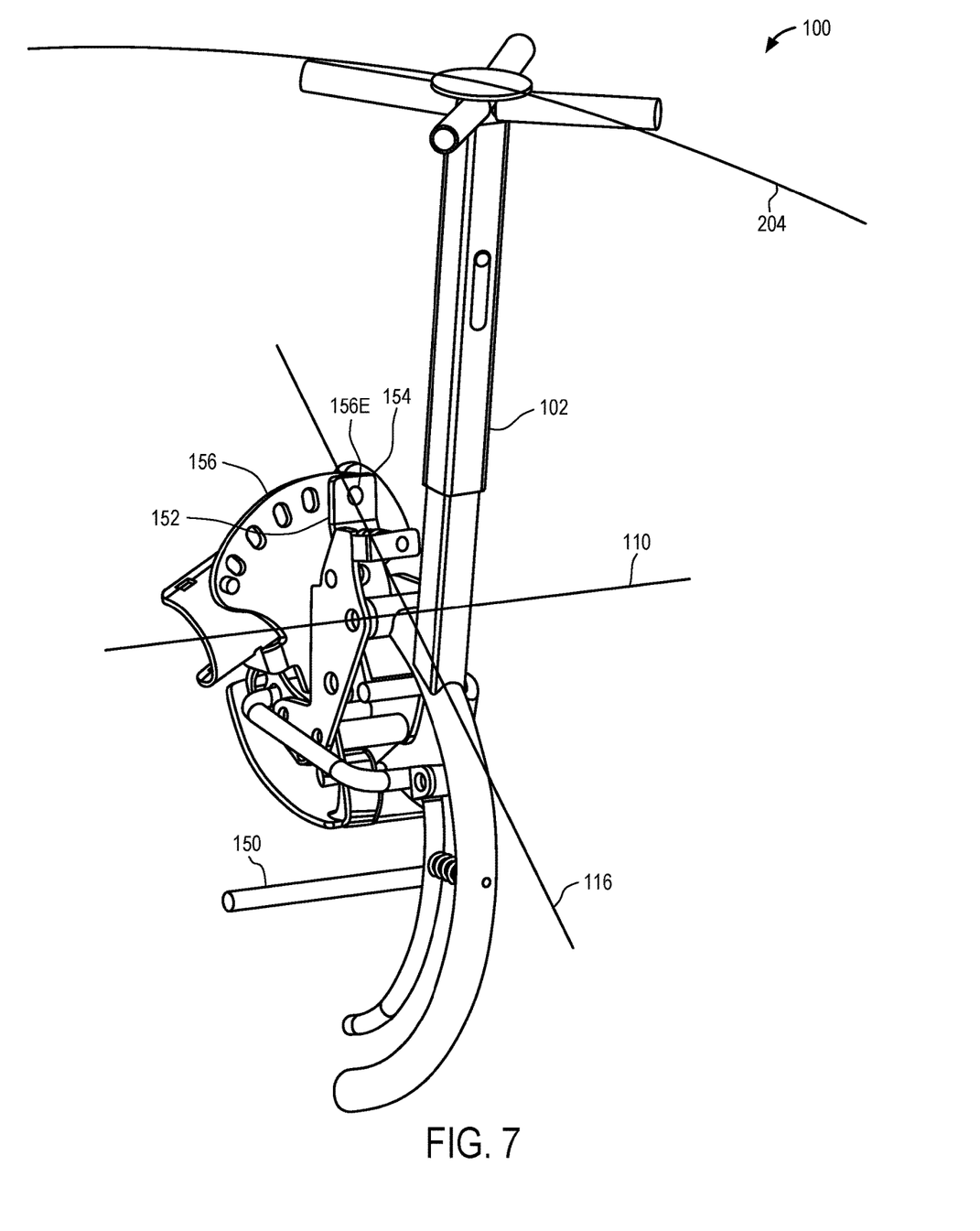
FIG. 7 illustrates a left back side perspective view of one embodiment of the canopy adjustor of FIG. 1.
Figure 8:
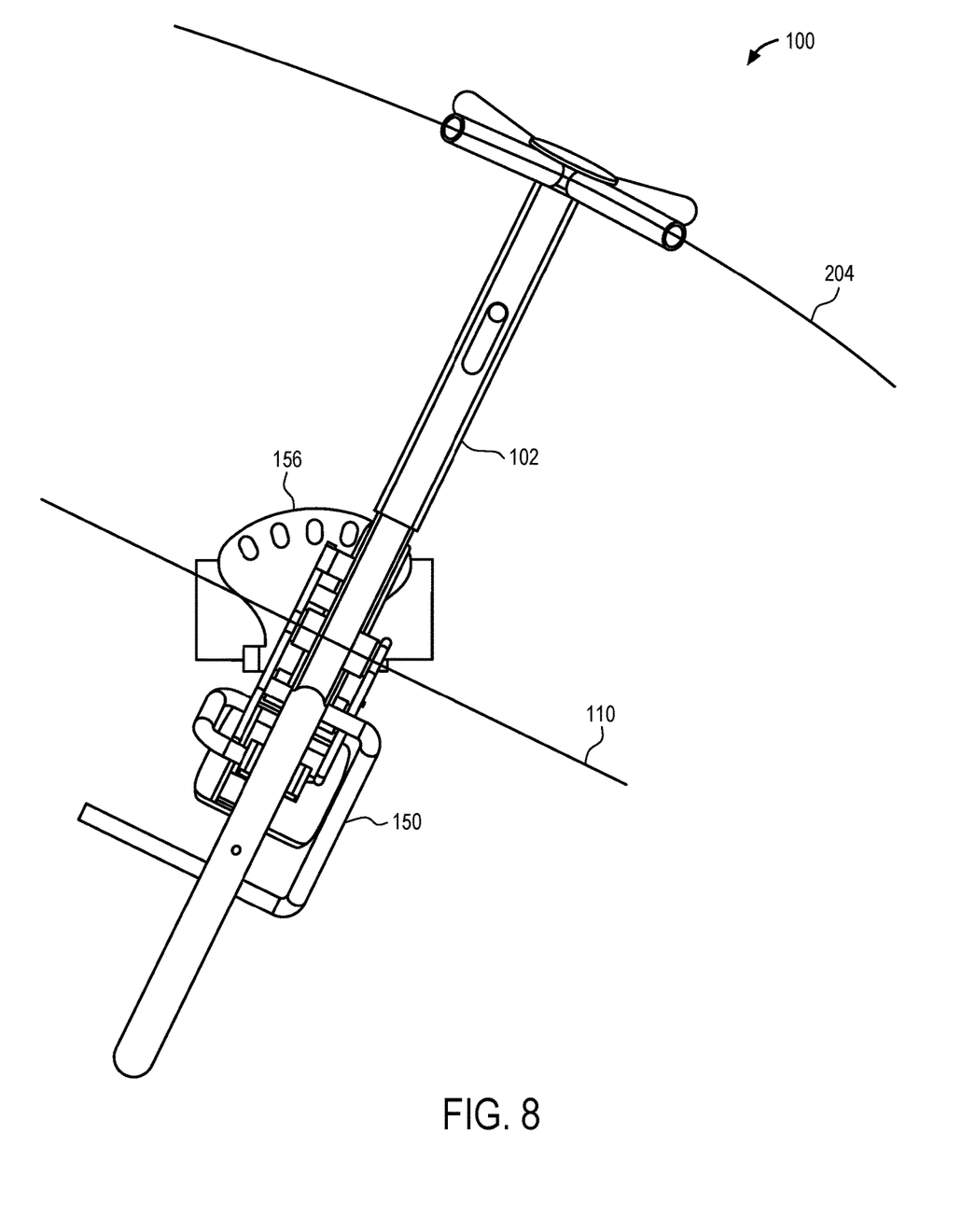
FIG. 8 illustrates a back side view of one embodiment of the canopy adjustor of FIG. 1.

Similar to the previously discussed positioning bracket 126, positioning bracket 156 may include a number of receiving notches or openings 156A-156E dimensioned to receive and hold the biased pin 154 coupled to lever 152, which in turn, locks the canopy 204 (and support member 102) at the desired tilt angle. Representatively, handle 150 may be coupled to lever 152, which is in turn attached to the biased pin 154. The biased pin 154 is biased by biasing member 162 (e.g., a spring) in a direction of the positioning bracket 156 (e.g. biased toward engagement). Accordingly, in its resting or non-actuated position, the biased pin 156 is inserted through, and engages with, one of openings 156A-E to lock the support member 102, and in in turn the canopy, at the particular tilt angle set by the openings 156A-E. To disengage or unlock the biased pin 154 and allow for adjustment of the tilt angle, the user pushes the handle 150 forward (e.g., away from handle 122). This, in turn, causes the lever 152 and the biased pin 154 to move away from the openings 156A-E and disengages the biased pin 154 from the respective opening 156A-E. The user can then rotate the support arm 102 about the second axis 116 to tilt the canopy left and/or right until the desired tilt angle is reached. Once the desired tilt angle is reached, the user may release the handle 150, which causes the biased pin 154 to re-engage the respective opening 156A-E associated with that angle to lock the canopy at the adjusted tilt angle. As can be seen from FIGS. 5-8, the receiving notches or openings 156A-E are at particular positions along the positioning bracket 156 that allow the user to lock the canopy at different tilt angles. For example, FIG. 5 shows the biased pin 154 in the left most opening 156A which may cause the canopy to be locked in a position tilted to the left. FIG. 6 shows the biased pin 154 in the center notch or opening 156C which may cause the canopy to be locked in a more centered and in some cases a horizontal position. FIGS. 7-8 show the biased pin 154 in the right most opening 156E which may cause the canopy to be locked in a position tilted to the right. This operation and/or configuration of the handle 150, lever 152, biased pin 154 and positioning bracket 156 used to lock and release the second adjustment mechanism 114 may also be generally referred to herein as a lock and release mechanism, or the adjustment mechanism including the above described components may be considered the lock and release mechanism.

FIG. 9 is a left side view of a garden swing in which the adjustor described herein may be implemented. FIG. 9 illustrates that swing 1000 may include canopy 1600 mostly covering lounge seat 1300. Canopy 1600 may have adjustor 100 attached to frame 1202 and/or support member 1200 for holding canopy 1600. In particular, canopy 160 may be attached by adjustor 100 to the top of frame 1202 and/or support member 1200 to support canopy 1600. Canopy 1600 may be constructed of any various outdoor appropriate materials such as canvas or another suitable material. As previously discussed, adjustor 100 may allow canopy 1600 to pivotally rotate forward, rearward, left or right as desired by an occupant. From this view, it can be seen that canopy 1600 can be adjusted to have a distance D (within a range of D1-D2) from the seat by adjusting the support member 102 of adjustor 100 as previously discussed. For example, in some aspects the support member is a telescoping bar that has an adjustable length that can be used to adjust the canopy 1600 between a maximum distance D1 and a minimum distance D2 from the garden swing. In addition, in some aspects, an adjustment range of the tilt of canopy 1600 in the second direction (e.g., left and/or right) may increase as the canopy is moved closer to the maximum distance D1 from the swing (e.g., the canopy is moved farther from the swing and frame).

In some embodiments, member 1200 may have a top portion 1220 attached to the frame and a bottom portion 1240 that extends under the lounge seat 1300. The lounge seat 1300 may include a seat portion and a backrest portion that are rigidly or movably affixed with leg rest portion 1302. The lounge seat 1300 in FIG. 9 may also include an optional adjustment device with a movable connection that may be located along the linear portion of leg rest portion 1302 or at the connection between the leg rest portion and the seat portion. With a partially rigid lounge seat 1300, leg rest portion 1302 may rotate relative to the seat portion in order to accommodate occupants with longer or shorter legs or to adjust the comfort to the occupant's desire.

Similarly, and for similar reasons, an optional adjustment device may be located along the linear portion of back rest portion or at the connection between back rest portion and a head rest portion.

Frame 1202 may include a base portion 1040 with ends 1050 that raise the frame and seat above ground so that an occupant of lounge seat 1300, with leg rest portion 1302, if moveable, can comfortably rest his or her feet on the ground. This permits easy ingress to and egress from lounge seat 1300 and also allows an occupant to easily propel lounge seat 1300 of swing 1000 in a pendular motion using his or her feet against the ground. Lounge seat 1300 may be pivotally attached by axial joint 1440 to lower portion 1420 of support member 1200 proximal the center of gravity of lounge seat 1300. It is preferred that axial joint 1400 be located proximal to lounge seat 1300 and preferably as close to the center of gravity of lounge seat 1300 as mechanically possible.

FIG. 10 illustrates a front perspective view of a garden swing including a canopy adjustor. Representatively, FIG. 10 shows garden swing 1000 as previously discussed and including an additional lounge swing 1300. In addition, from this view, attachment of the adjustor 100 to the top side of frame 1202 to allow for adjustment of a tilt angle of canopy 1600 is more clearly seen.

While certain aspects have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting. In addition, to aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A garden swing canopy adjustor comprising,
   a support member having a first end configured to be coupled to a garden swing canopy and a second end;
   a first adjustment mechanism fixedly coupled to the second end of the support member, the first adjustment mechanism is operable to rotate the support member around a first axis to adjust a tilt of the garden swing canopy in a first direction; and
   a second adjustment mechanism coupled to the first adjustment mechanism, the second adjustment mechanism is operable to rotate the support member around a second axis to adjust the tilt of the garden swing canopy in a second direction, and wherein the second axis is approximately perpendicular to the first axis and comprises a fixed orientation.

2. The adjustor of claim 1 wherein the first axis is a pitch axis and the first direction is a forward direction or a backward direction.

3. The adjustor of claim 1 wherein the second axis is a roll axis and the second direction is a left direction or a right direction.

4. The adjustor of claim 1 wherein rotation of the support member around the second axis changes an orientation of the first axis.

5. The adjustor of claim 1 wherein a rotation of the support member around the first axis does not rotate the support member around the second axis.

6. The adjustor of claim 1 wherein a rotation of the support member around the second axis also rotates the first adjustment mechanism around the second axis.

7. The adjustor of claim 1 wherein the first adjustment mechanism comprises a body portion fixedly coupled to the second end of the support member and a handle coupled to the body portion for controlling the rotation of the support member around the first axis.

8. The adjustor of claim 7 wherein the handle is coupled to a lever that releasably engages with a positioning bracket having a plurality of notches to hold the support member at a desired angle of rotation, and squeezing the handle releases the lever from the positioning bracket.

9. The adjustor of claim 1 wherein the second adjustment mechanism comprises a positioning bracket fixedly coupled to a garden swing support member and a handle coupled to the positioning bracket for controlling the rotation of the support member around the second axis.

10. The adjustor of claim 9 wherein the handle is coupled to a lever that releasably engages with a positioning bracket having a plurality of openings, and pushing the handle releases the lever from the positioning bracket.

11. The adjustor of claim 1 wherein the support member is a telescoping bar that is operable to adjust a distance between the garden swing canopy and a garden swing to which it is coupled.

12. The adjustor of claim 11 wherein the telescoping bar adjusts the garden swing canopy between a maximum distance from the garden swing and a minimum distance from the garden swing, and wherein adjustment of the garden swing canopy in the second direction increases toward the maximum distance.

13. The adjustor of claim 1 wherein the second adjustment mechanism is fixedly coupled to an overhead frame member from which a garden swing is suspended such that a user operates the adjustor above their head.

14. The adjustor of claim 12 wherein the first axis and the second axis are closer to the garden swing canopy than the garden swing.

15. The adjustor of claim 12 wherein the first adjustment mechanism and the second adjustment mechanism are configured to be controlled independently by one hand of a user.

16. The adjustor of claim 1 wherein the first adjustment mechanism and the second adjustment mechanism do not comprise a ball joint.

17. A swing canopy adjustor comprising;
    a support member having a first end configured to be coupled to a swing canopy and a second end;
    a first adjustment mechanism fixedly coupled to the second end of the support member, the first adjustment mechanism is operable to rotate the support member around a first axis to adjust a tilt of the swing canopy in a first direction; and
    a second adjustment mechanism coupled to the first adjustment mechanism, the second adjustment mechanism is operable to rotate the support member around a second axis, different from the first axis, to adjust the tilt of the swing canopy in a second direction.

18. The adjustor of claim 17 wherein the first axis is a pitch axis and the first direction is a forward direction or a backward direction.

19. The adjustor of claim 17 wherein the second axis is a roll axis and the second direction is a left direction or a right direction.

20. The adjustor of claim 17 wherein rotation of the support member around the second axis changes an orientation of the first axis.

21. The adjustor of claim 17 wherein a rotation of the support member around the first axis does not rotate the support member around the second axis.

22. The adjustor of claim 17 wherein a rotation of the support member around the second axis also rotates the first adjustment mechanism around the second axis.

23. The adjustor of claim 17 wherein the first adjustment mechanism comprises a body portion fixedly coupled to the second end of the support member and a handle coupled to the body portion for controlling the rotation of the support member around the first axis.

24. The adjustor of claim 23 wherein the handle is coupled to a lever that releasably engages with a positioning bracket having a plurality of notches to hold the support member at a desired angle of rotation, and squeezing the handle releases the lever from the positioning bracket.

25. The adjust of claim 17 wherein the second adjustment mechanism comprises a positioning bracket fixedly coupled to a swing support member and a handle coupled to the positioning bracket for controlling the rotation of the support member around the second axis.

26. The adjustor of claim 25 wherein the handle is coupled to a lever that releasably engages with a positioning bracket having a plurality of openings, and pushing the handle releases the lever from the positioning bracket.

27. The adjustor of claim 17 wherein the support member is a telescoping bar that is operable to adjust a distance between the swing canopy and a garden swing to which it is coupled.

28. The adjustor of claim 27 wherein the telescoping bar adjusts the swing canopy between a maximum distance from the garden swing and a minimum distance from the garden swing, and wherein adjustment of the swing canopy in the second direction increases toward the maximum distance.

29. The adjustor of claim 17 wherein the second adjustment mechanism is fixedly coupled to an overhead frame member from which a garden swing is suspended such that a user operates the adjustor above their head.

30. The adjustor of claim 28 wherein the first axis and the second axis are closer to the swing canopy than the garden swing.

31. The adjustor of claim 28 wherein the first adjustment mechanism and the second adjustment mechanism are configured to be controlled independently by one hand of a user.

32. The adjustor of claim 17 wherein the first adjustment mechanism and the second adjustment mechanism do not comprise a ball joint.

33. A swing canopy adjustor comprising;
   a support member having a first end configured to be coupled to a swing canopy and a second end;
   a first adjustment mechanism coupled to the second end of the support member, the first adjustment mechanism is operable to rotate the support member around a first axis to adjust a tilt of the swing canopy in a first direction; and
   a second adjustment mechanism coupled to the first adjustment mechanism, the second adjustment mechanism is operable to rotate the support member around a second axis to adjust the tilt of the swing canopy in a second direction;
   wherein the first and second adjustment mechanisms are operated independently.

34. The adjustor of claim 33 wherein the first axis is a pitch axis and the first direction is a forward direction or a backward direction.

35. The adjustor of claim 33 wherein the second axis is a roll axis and the second direction is a left direction or a right direction.

36. The adjustor of claim 33 wherein rotation of the support member around the second axis changes an orientation of the first axis.

37. The adjustor of claim 33 wherein a rotation of the support member around the first axis does not rotate the support member around the second axis.

38. The adjustor of claim 33 wherein a rotation of the support member around the second axis also rotates the first adjustment mechanism around the second axis.

39. The adjustor of claim 33 wherein the first adjustment mechanism comprises a body portion fixedly coupled to the second end of the support member and a handle coupled to the body portion for controlling the rotation of the support member around the first axis.

40. The adjustor of claim 39 wherein the handle is coupled to a lever that releasably engages with a positioning bracket having a plurality of notches to hold the support member at a desired angle of rotation, and squeezing the handle releases the lever from the positioning bracket.

41. The adjustor of claim 33 wherein the second adjustment mechanism comprises a positioning bracket fixedly coupled to a swing support member and a handle coupled to the positioning bracket for controlling the rotation of the second adjustment mechanism around the second axis.

42. The adjustor of claim 41 wherein the handle is coupled to a lever that releasably engages with a positioning bracket having a plurality of openings, and pushing the handle releases the lever from the positioning bracket.

43. The adjustor of claim 33 wherein the support member is a telescoping bar that is operable to adjust a distance between the swing canopy and a garden swing to which it is coupled.

44. The adjustor of claim 43 wherein the telescoping bar adjusts the swing canopy between a maximum distance from the garden swing and a minimum distance from the garden swing, and wherein adjustment of the swing canopy in the second direction increases toward the maximum distance.

45. The adjustor of claim 33 wherein the second adjustment mechanism is fixedly coupled to an overhead frame member from which a garden swing is suspended such that a user operates the adjustor above their head.

46. The adjustor of claim 44 wherein the first axis and the second axis are closer to the swing canopy than the garden swing.

47. The adjustor of claim 44 wherein the first adjustment mechanism and the second adjustment mechanism are configured to be controlled independently by one hand of a user.

48. The adjustor of claim 33 wherein the first adjustment mechanism and the second adjustment mechanism do not comprise a ball joint.

49. A canopy adjustor for a garden swing with a single pivot pendulous motion swing seat, comprising,
   a support member having a first end configured to be coupled to a garden swing canopy and a second end;
   a first adjustment mechanism coupled to the second end of the support member, the first adjustment mechanism including a first lock and release mechanism that is operable to rotate the support member around a first axis to adjust a tilt of the garden swing canopy in a first direction; and
   a second adjustment mechanism coupled to the first adjustment mechanism, the second adjustment mechanism including a second lock and release mechanism that is operable to rotate the support member around a second axis to adjust the tilt of the garden swing canopy in a second direction, and
   wherein the canopy adjustor is located above the swing seat and operable to be manipulated above a head of a user seated in the swing seat with one hand.

50. The adjustor of claim 49 wherein the first axis is a pitch axis and the first direction is a forward direction or a backward direction.

51. The adjustor of claim 49 wherein the second axis is a roll axis and the second direction is a left direction or a right direction.

52. The adjustor of claim 49 wherein rotation of the support member around the second axis changes an orientation of the first axis.

53. The adjustor of claim 49 wherein a rotation of the support member around the first axis does not rotate the support member around the second axis.

54. The adjustor of claim 49 wherein a rotation of the support member around the second axis also rotates the first adjustment mechanism around the second axis.

55. The adjustor of claim 49 wherein the first adjustment mechanism comprises a body portion fixedly coupled to the second end of the support member and a handle coupled to the body portion for controlling the rotation of the support member around the first axis.

56. The adjustor of claim 55 wherein the first lock and release mechanism comprises a lever that releasably engages with a positioning bracket having a plurality of notches to hold the support member at a desired angle of rotation, and squeezing the handle releases the lever from the positioning bracket.

57. The adjustor of claim 49 wherein the second adjustment mechanism comprises a positioning bracket fixedly coupled to a garden swing support member and a handle coupled to the positioning bracket for controlling the rotation of the second adjustment mechanism around the second axis.

58. The adjustor of claim 57 wherein the second lock and release mechanism comprises a lever that releasably engages with a positioning bracket having a plurality of openings, and pushing the handle releases the lever from the positioning bracket.

59. The adjustor of claim 49 wherein the support member is a telescoping bar that is operable to adjust a distance between the garden swing canopy and a garden swing to which it is coupled.

60. The adjustor of claim 49 wherein the canopy adjustor is coupled to an overhead frame member from which the garden swing is suspended.

\* \* \* \* \*